(12) United States Patent
Liu

(10) Patent No.: US 9,635,165 B2
(45) Date of Patent: Apr. 25, 2017

(54) METHOD AND TERMINAL FOR CONNECTION SWITCHOVER FOR HEADPHONE JACK ADAPTOR DEVICE

(71) Applicant: KUANG-CHI INTELLIGENT PHOTONIC TECHNOLOGY LTD., Shenzhen (CN)

(72) Inventor: Ruopeng Liu, Shenzhen (CN)

(73) Assignee: KUANG-CHI INTELLIGENT PHOTONIC TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 15/153,261

(22) Filed: May 12, 2016

(65) Prior Publication Data

US 2016/0261732 A1    Sep. 8, 2016

Related U.S. Application Data

(63) Continuation of application No. PCT/CN2014/083456, filed on Jul. 31, 2014.

(30) Foreign Application Priority Data

Nov. 15, 2013 (CN) .......................... 2013 1 0569139

(51) Int. Cl.
*H04M 3/00* (2006.01)
*H04M 1/725* (2006.01)
*H04M 1/60* (2006.01)
*H04M 1/737* (2006.01)
*H04W 76/02* (2009.01)

(52) U.S. Cl.
CPC ....... *H04M 1/7253* (2013.01); *H04M 1/6058* (2013.01); *H04M 1/72527* (2013.01); *H04M 1/737* (2013.01); *H04W 76/028* (2013.01)

(58) Field of Classification Search
USPC ...................................... 455/418, 567, 575.2
See application file for complete search history.

(56) References Cited

U.S. PATENT DOCUMENTS

| 2008/0167092 A1* | 7/2008 | Ueda ................... H04M 1/6066 455/575.2 |
| 2010/0124947 A1* | 5/2010 | Sano ................... H04M 1/7253 455/567 |

FOREIGN PATENT DOCUMENTS

| CN | 1325250 A | 12/2001 |
| CN | 2489525 Y | 5/2002 |
| CN | 2492026 Y | 5/2002 |
| CN | 1516950 A | 7/2004 |

(Continued)

*Primary Examiner* — David Q Nguyen
(74) *Attorney, Agent, or Firm* — Perkins Coie LLP

(57) ABSTRACT

A method and terminal for switching a connection of a headphone jack adaptor device are provided. The method includes: monitoring a status of a phone, when it is determined that it is required to make/answer a call, disconnecting a signal connection between an audio signal and a headphone jack, and when it is determined that the call is ended, establishing a signal connection between the audio signal and the headphone jack. In the method for connection switchover for a headphone jack adaptor device according to the present disclosure, a connection status of a headphone jack adaptor device is switched according to monitoring a status of a phone, so that a user can normally make/answer a call without pulling out the headphone jack adaptor device when using the headphone jack adaptor device.

6 Claims, 4 Drawing Sheets

(56) References Cited

FOREIGN PATENT DOCUMENTS

| CN | 103795853 A | 5/2014 | |
|---|---|---|---|
| GB | 2308775 A | 7/1997 | |
| KR | WO 02080504 A1 * | 10/2002 | ........... H04R 1/1025 |

* cited by examiner

METHOD AND TERMINAL FOR CONNECTION SWITCHOVER FOR HEADPHONE JACK ADAPTOR DEVICE

CROSS REFERENCE TO RELATED APPLICATIONS

This application is a continuation of PCT Application No. PCT/CN2014/083456 filed on Jul. 31, 2014, which claims priority to Chinese patent application No. 201310569139.3 of Nov. 15, 2013, both of which are incorporated herein by reference.

TECHNICAL FIELD

The present disclosure relates to the field of electronic technologies, and specifically, to a method for connection switchover for a headphone jack adaptor device, and a terminal for executing the method.

BACKGROUND

With continuous development of the electronic technologies, diversified adaptor devices are invented for electronic devices such as mobile phones, so as to provide users with a wealth of features and convenience. Headphone jack adapter devices connected to electronic devices such as mobile phones are a type of such adaptor devices. Some headphone jack adapter devices are not headphones for voice calls but for implementing other functions. For example, an optical communications adaptor terminal with an audio connector can implement dual-way communication with a receiving end and can be used to implement functions such as access control, optical payment, and optical ticketing.

When a headphone jack adaptor device is inserted into a headphone jack of an electronic device, the electronic device switches to a voice-over-headphone state. If a user needs to make/answer a call, the headphone jack adaptor device needs to be pulled out from the headphone jack, which brings inconvenience to an operation.

SUMMARY

A first aspect of the present disclosure provides a method for connection switchover for a headphone jack adaptor device. The method includes: monitoring a status of a phone; determining whether it is required to make/answer a call; when it is determined that it is required to make/answer a call, disconnecting a signal connection between an audio signal and a headphone jack; determining whether the call is ended; and when it is determined that the call is ended, establishing a signal connection between the audio signal and the headphone jack.

Another aspect of the present disclosure provides a terminal for performing a method for connection switchover for a headphone jack adaptor device. The terminal includes: a call status monitoring module, configured to monitor a status of a phone, determine whether it is required to make/answer a call, and determine whether the call is ended; and a status switchover module, configured to: according to a determining result of the call status monitoring module, disconnect a signal connection between an audio signal and a headphone jack when it is determined that it is required to make/answer a call, and establish a signal connection between the audio signal and the headphone jack when it is determined that the call is ended.

In the method for connection switchover for a headphone jack adaptor device according to the present disclosure, a connection status of a headphone jack adaptor device is switched according to monitoring a status of a phone, so that a user can normally make/answer a call without pulling out the headphone jack adaptor device when using the headphone jack adaptor device, thereby improving convenience of use.

The following specifically describes embodiments of the present disclosure with reference to accompanying drawings. For brevity, similar structures in the embodiments use a same mark.

DESCRIPTION OF EMBODIMENTS

Embodiment 1

Figure 1:
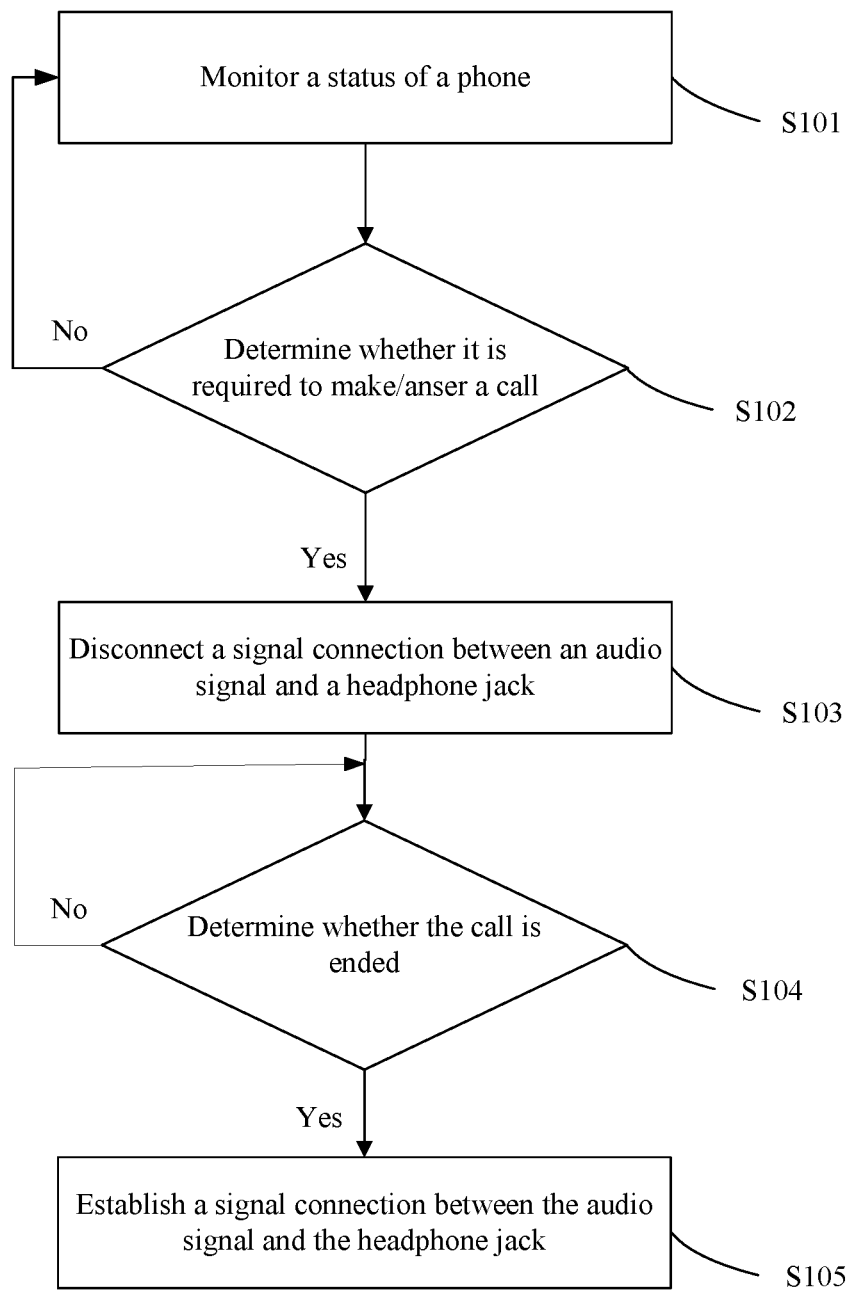
FIG. 1 is a schematic flowchart of a method for connection switchover for a headphone jack adaptor device according to Embodiment 1.

FIG. 1 shows an example of a method for connection switchover for a headphone jack adaptor device according to an embodiment of the present disclosure. The method includes the following steps:

S101. Monitor a status of a phone.

Generally, a terminal device (such as a mobile phone) with a communications function implements control and use of various functions by using a built-in operating system. Common operation systems include Symbian, Linux, Windows Mobiles, Android, IOS, WP, and the like. The mobile phone operating systems allow for query and monitoring a call status. For brevity, the Android system is used as an example for description in this embodiment. An operating system of another type can adopt a similar method for implementation. Type of operating system does not intend to limit the embodiment of the present disclosure.

In the Android system, a telephony manager allows for query and monitoring module information of a mobile phone. Therefore, a status of a phone can be obtained by sending a request for querying status or registering monitoring to the telephony manager. In this embodiment, the status of the phone can be obtained in a manner of registering monitoring of a phone call status change event to the telephony manager.

In another example, when a call comes in, a phone may vibrate, ring, or show an image reminder, and when making an outgoing call, a user need to trigger dialing by pressing a keyboard or touching a screen, or by voice etc. Therefore, the status of the phone can also be obtained by monitoring an action of a related processing module.

S102. Determine whether it is required to make/answer a call.

If yes, perform step S103; if no, continue monitoring the status of the phone.

In this embodiment, determining whether it is required to make/answer a call is specifically: determining whether there is an incoming call and determining whether to make an outgoing call. An incoming call event and an outgoing call event are obtained by monitoring the status of the phone. In another embodiment, the determining whether it is required to make/answer a call can also be performed at another stage in a call connection process, as long as the determining is completed before both sides in communication talk to each other on the phone. For example, for an incoming call, it may be further determined whether to answer the incoming call, and whether a user answers the incoming call is used as a result of the determining whether it is required to make/answer a call. For an outgoing call, it may be further determined whether a ring-back tone is heard or whether a called party answers the call, which is used as a result of the determining whether it is required to make/answer a call.

S103. Disconnect a signal connection between an audio signal and a headphone jack.

For the Android system, access of a headphone cable can be cut off by using an audioManager.setWiredHeadsetOn (false) instruction. Then, voice during the call is input through a microphone on a body of a terminal device and output through an earphone on the body. Thus a user can normally make/answer the call.

S104. Determine whether the call is ended.

If yes, perform step S105; if no, wait until the call ends.

In this embodiment, that a calling status is ended is obtained by monitoring the status of the phone. In another embodiment, that a calling status is ended can also be obtained by monitoring an operation related to call ending, such as hanging up the phone.

S105. Establish a signal connection between the audio signal and the headphone jack.

For the Android system, the signal connection between the audio signal and the headphone jack can be established by using an audioManager.setWiredHeadsetOn(true) instruction. Then, the headphone jack adaptor device inserted into the headphone jack can be resumed for use.

In the method for connection switchover for a headphone jack adaptor device according to this embodiment, a connection status of the headphone jack adaptor device is switched according to monitoring a status of a phone, so that a user can normally make/answer a call without pulling out the headphone jack adaptor device when using the headphone jack adaptor device, thereby improving convenience of use.

Embodiment 2

Figure 2:
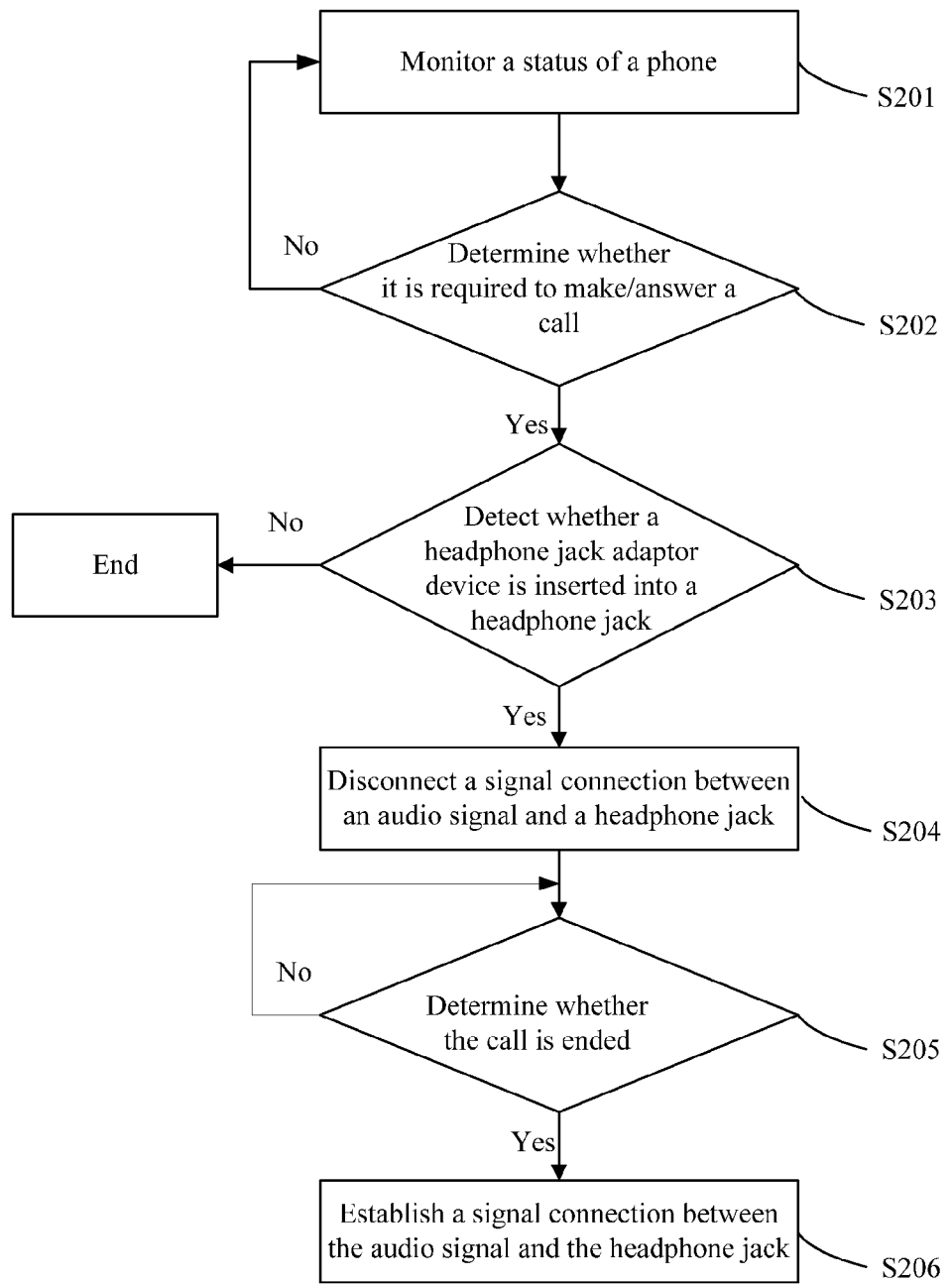
FIG. 2 is a schematic flowchart of a method for connection switchover for a headphone jack adaptor device according to Embodiment 2.

FIG. 2 shows another implementation manner of a method for connection switchover for a headphone jack adaptor device according to an embodiment of the present disclosure. A main difference from Embodiment 1 is that, in this embodiment, before a headphone signal connection is disconnected, it is further determined whether a headphone jack adaptor device is inserted. The method includes the following steps:

S201. Monitor a status of a phone.

S202. Determine whether it is required to make/answer a call. If yes, perform step S203; if no, continue monitoring the status of the phone.

Steps S201 to S202 may be performed correspondingly with reference to steps S101 to S102, and details are not described herein again.

S203. Detect whether a headphone jack adaptor device is inserted into a headphone jack. If yes, perform step S204; if no, end the process. In another embodiment, if no headphone jack adaptor device is inserted into the headphone jack, monitoring the status of the phone may be continued.

For an Android system, whether a headphone jack adaptor device is inserted into the headphone jack can be detected by determining whether a returned value of audioManager.isWiredHeadSetOn( ) is true. If the returned value is true, it indicates that a headphone jack adaptor device is inserted into the headphone jack. If the returned value is not true, it indicates that no headphone jack adaptor device is inserted into the headphone jack.

S204. Disconnect a signal connection between an audio signal and the headphone jack.

S205. Determine whether the call is ended. If yes, perform step S206; if no, wait until the call ends.

S206. Establish a signal connection between the audio signal and the headphone jack.

Steps S204 to S206 may be performed correspondingly with reference to steps S103 to S105, and details are not described herein again.

Only after a headphone jack adaptor device is inserted into the headphone jack does a terminal device start a corresponding calling mode according to insertion information returned by an audio interface manager. For example, disabling a receiver and a microphone in a body of the device, and enabling a receiver and a microphone of a headphone. Therefore, before performing the step of disconnecting a signal connection between an audio signal and the headphone jack, whether a headphone jack adaptor device is inserted is firstly determined, so that unnecessary disconnection operation is avoided. In this embodiment, the step of detecting whether a headphone jack adaptor device is inserted into a headphone jack is performed after determining a call status. In another embodiment, the step may also be performed before determining a call status.

The headphone jack adaptor device in this embodiment of the present disclosure may be an enclosure device that connects to a headphone jack of an electronic device to implement functions. For example, may be an adaptor terminal for non-contact communication, where a communication medium of the non-contact communication may be at least one medium selected from the followings: visible light, infrared light, ultraviolet light, an infrasonic wave, an audible wave, and an ultrasonic wave.

In particular, the headphone jack adaptor device is a device called light stick. The light stick is a dual-way communication device and includes a visible-light transmitter (such as a light emitting diode LED) connected to left and right channels of the headphone jack and an infrared-light receiver connected to a microphone channel of the headphone jack. The light stick audio connector with a shape matching the headphone jack and inserted into the headphone jack. The visible-light transmitter is configured to output a signal to an optical receive end device; the infrared-light receiver is configured to receive a signal, that is, infrared light. When the audio connector is inserted into the headphone jack adaptor device, through control by using related software, dual-way communication with an optical receive end, for example an optical key used in an access control system, can be implemented.

Embodiment 3

Figure 3:
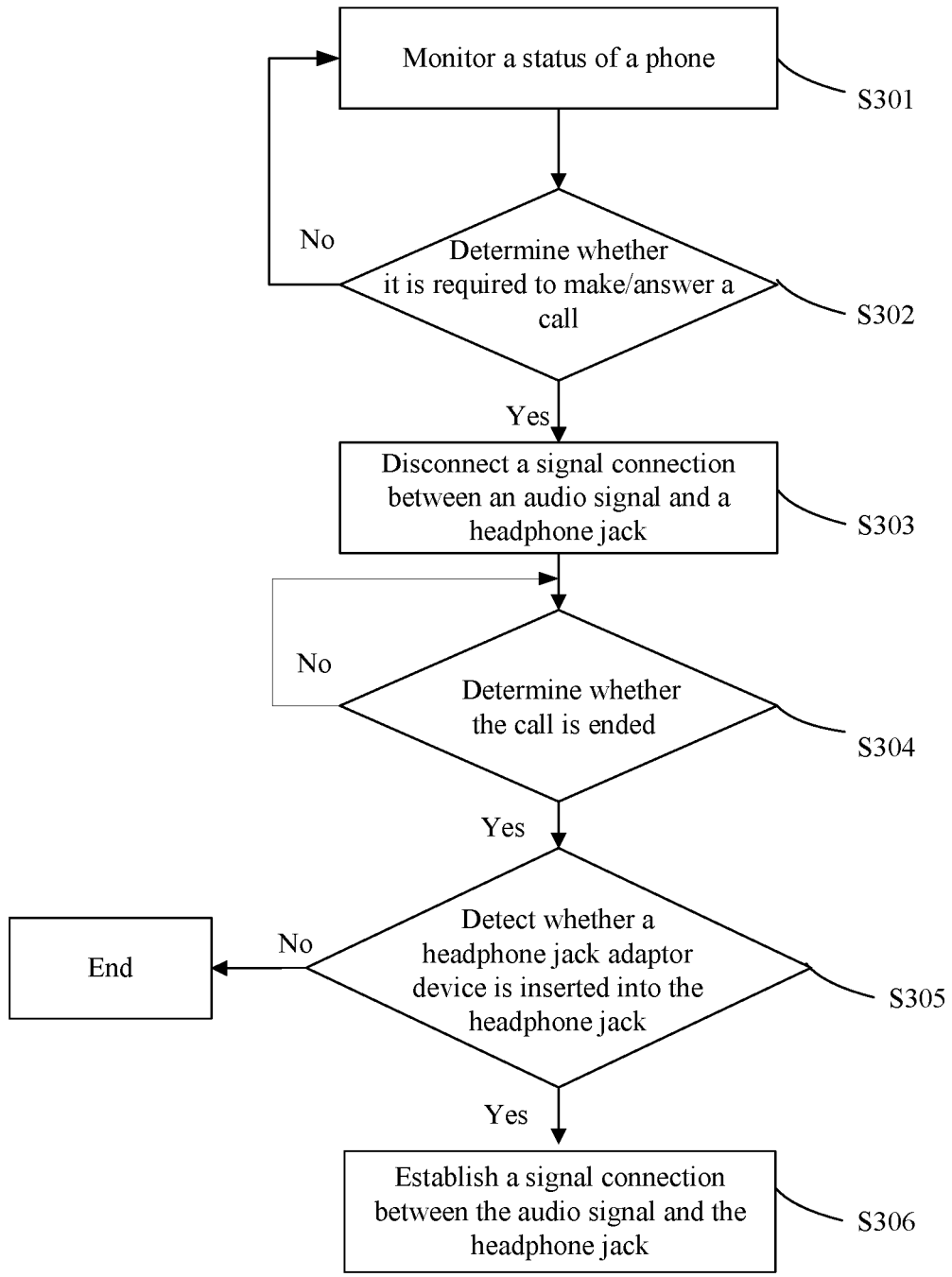
FIG. 3 is a schematic flowchart of a method for connection switchover for a headphone jack adaptor device according to Embodiment 3.

FIG. 3 shows another implementation manner of a method for connection switchover for a headphone jack adaptor device according to an embodiment of the present disclosure. A main difference from Embodiment 1 is that, before a headphone signal connection is established, whether a headphone jack adaptor device is inserted is further determined. The method includes the following steps:

S301. Monitor a status of a phone.

S302. Determine whether it is required to make/answer a call. If yes, perform step S303; if no, continue monitoring the status of the phone.

S303. Disconnect a signal connection between an audio signal and a headphone jack.

S304. Determine whether the call is ended. If yes, perform step S305; if no, wait until the call ends.

Steps S301 to S304 may be performed correspondingly with reference to steps S101 to S104, and details are not described herein again.

S305. Detect whether a headphone jack adaptor device is inserted into a headphone jack. If yes, perform step S306; if no, end the process. In another embodiment, if no headphone jack adaptor device is inserted into the headphone jack, monitoring the status of the phone may be continued.

For an Android system, whether a headphone jack adaptor device is inserted into the headphone jack can be detected by determining whether a returned value of audioManager.isWiredHeadSetOn( ) is true. If the returned value is true, it indicates that a headphone jack adaptor device is inserted into the headphone jack. If the returned value is not true, it indicates that no headphone jack adaptor device is inserted into the headphone jack.

S306. Establish a signal connection between the audio signal and the headphone jack. This step may be performed with reference to step S105, and details are not described herein again.

Only after a headphone jack adaptor device is inserted into the headphone jack is it required to connect an audio signal and the headphone jack of a terminal device. Therefore, before performing the step of establishing a signal connection between the audio signal and the headphone jack, whether a headphone jack adaptor device is inserted is firstly determined, so that unnecessary disconnection operation is avoided.

All or a part of the steps of the method for connection switchover for a headphone jack adaptor device according to the embodiments of the present disclosure may be implemented by a hardware related to program instructions. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Embodiment 4

Figure 4:
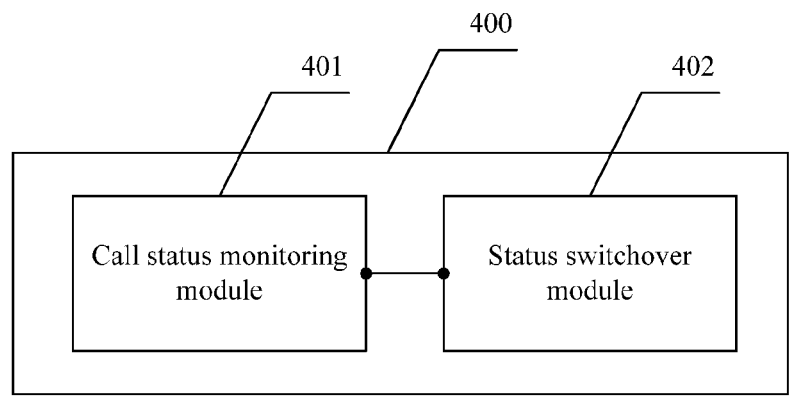
FIG. 4 is a schematic modular structure of a terminal according to Embodiment 4.

FIG. 4 shows an implementation manner of a terminal according to an embodiment of the present disclosure. The terminal 400 is configured to execute the method for connection switchover for a headphone jack adaptor device according to Embodiment 1. The terminal includes a call status monitoring module 401 and a status switchover module 402.

The call status monitoring module 401 is configured to monitor a status of a phone, determine whether it is required to make/answer a call, and determine whether the call is ended.

The status switchover module 402 is configured to: according to a determining result of the call status monitoring module 401, disconnect a signal connection between an audio signal and a headphone jack when it is determined that it is required to make/answer a call, and establish a signal connection between the audio signal and the headphone jack when it is determined that the call is ended.

The terminal in this embodiment may specifically be a mobile terminal device with a communications function, such as a mobile phone, a personal digital assistant, and a tablet.

The terminal according to this embodiment switches a connection status of a headphone jack adaptor device according to monitoring a status of a phone, so that a user can normally make/answer a call without pulling out the headphone jack adaptor device when using the headphone jack adaptor device, thereby improving convenience of use.

Embodiment 5

Figure 5:
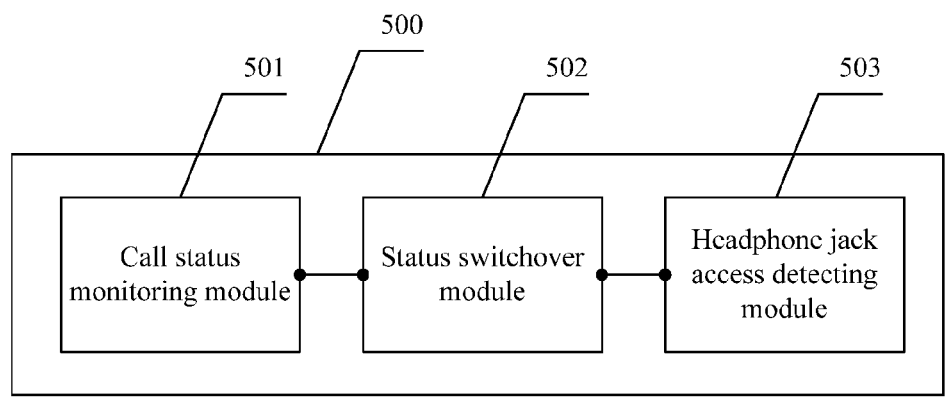
FIG. 5 is a schematic modular structure of a terminal according to Embodiment 5.

FIG. 5 shows another implementation manner of a terminal according to an embodiment of the present disclosure. The terminal 500 is configured to execute the method for connection switchover for a headphone jack adaptor device according to Embodiment 2. The terminal includes a call status monitoring module 501, a status switchover module 502, and a headphone jack access detecting module 503.

The call status monitoring module 501 is configured to monitor a status of a phone, determine whether it is required to make/answer a call, and determine whether the call is ended.

The headphone jack access detecting module 503 is configured to detect whether a headphone jack adaptor device is inserted into a headphone jack.

The status switchover module 502 is configured to: when it is determined, according to a determining result of the call status monitoring module 501, that it is required to make/answer a call, perform processing according to a detection result of the headphone jack access detecting module 503; if a headphone jack adaptor device is inserted into the headphone jack, perform the step of disconnecting a signal connection between the audio signal and the headphone jack; and if no, skip performing the step of disconnecting a signal connection between the audio signal and the headphone jack; and when it is determined that the call is ended, establish a signal connection between the audio signal and the headphone jack.

Before disconnecting a signal connection between an audio signal and a headphone jack, the terminal according to this embodiment firstly determines whether a headphone jack adaptor device is inserted, so that unnecessary disconnection operation is avoided.

Embodiment 6

Figure 6:
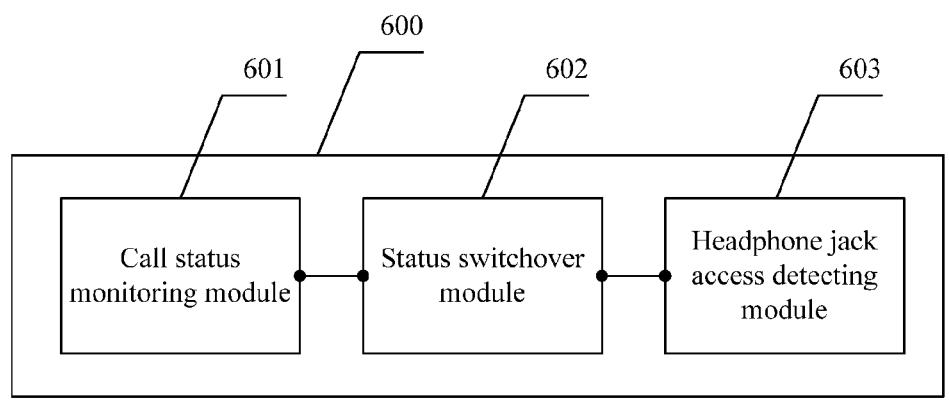
FIG. 6 is a schematic modular structure of a terminal according to Embodiment 6.

FIG. 6 shows another implementation manner of a terminal according to an embodiment of the present disclosure. The terminal 600 is configured to execute the method for connection switchover for a headphone jack adaptor device according to Embodiment 3. The terminal includes: a call status monitoring module 601, a status switchover module 602, and a headphone jack access detecting module 603.

The call status monitoring module 601 is configured to monitor a status of a phone, determine whether it is required to make/answer a call, and determine whether the call is ended.

The headphone jack access detecting module 603 is configured to detect whether a headphone jack adaptor device is inserted into a headphone jack.

The status switchover module 602 is configured to: when it is determined that it is required to make/answer a call according to a determining result of the all status monitoring module 601, disconnect a signal connection between an audio signal and the headphone jack; when it is determined that the call is ended, process according to a detection result of the headphone jack access detecting module 603; and if a headphone jack adaptor device is inserted into the headphone jack, establish a signal connection between the audio signal and the headphone jack; if no headphone jack adaptor device is inserted into the headphone jack, skip the step of establishing a signal connection between the audio signal and the headphone jack.

Before establishing a signal connection between the audio signal and the headphone jack, the terminal according this embodiment firstly determines whether a headphone jack adaptor device is inserted, so that unnecessary connection operation is avoided.

The principle and implementation manners of the present disclosure are described through above specific embodiments. It should be understood that the implantation manners are merely used for facilitating understanding of the present disclosure but shall not be construed as a limitation on the present disclosure. Persons of ordinary skill in the art can make variations with respect to the implementation manners according to the idea of the present disclosure.

INDUSTRIAL APPLICABILITY

In the embodiments of the present disclosure, a connection status of a headphone jack adaptor device is switched according to monitoring a status of a phone, so that a user can normally make/answer a call without pulling out the headphone jack adaptor device when using the headphone jack adaptor device, thereby improving convenience of use.

What is claimed is:

1. A method for connection switchover for a headphone jack adaptor device, comprising:
   monitoring a status of a phone;
   determining whether it is required to make/answer a call;
   when it is determined that it is required to make/answer a call, disconnecting a signal connection between an audio signal and a headphone jack, wherein the headphone jack adaptor device is a device called light stick, the light stick is a dual-way communication device and comprises a visible-light transmitter connected to left and right channels of the headphone jack, and the visible-light transmitter is configured to output a light signal to an optical receive end device;
   determining whether the call is ended;
   when it is determined that the call is ended, establishing a signal connection between the audio signal and the headphone jack; and
   wherein before the disconnecting or establishing a signal connection between an audio signal and a headphone jack, the method further comprises:
   detecting whether a headphone jack adaptor device is inserted into the headphone jack; and if yes, performing the step of disconnecting or establishing a signal connection between an audio signal and a headphone jack, and if no, skipping performing the step of disconnecting or establishing a signal connection between an audio signal and a headphone jack.

2. The method according to claim 1, wherein the determining whether it is required to make/answer a call is specifically at least one operation in the group consisting of: determining whether there is an incoming call, determining whether to answer an incoming call, and determining whether to make an outgoing call.

3. The method according to claim 1, wherein the headphone jack adaptor device is an adaptor terminal for non-contact communication, and a communication medium of the non-contact communication is at least one medium selected from the group consisting of: visible light, infrared light, ultraviolet light, an infrasonic wave, an audible wave, and an ultrasonic wave.

4. A terminal for executing a method for connection switchover for a headphone jack adaptor device, comprising:
   a call status monitoring module, configured to monitor a status of a phone, determine whether it is required to make/answer a call, and determine whether the call is ended;
   a status switchover module, configured to: according to a determining result of the call status monitoring module, disconnect a signal connection between an audio signal and a headphone jack when it is determined that it is required to make/answer a call, and establish a signal connection between the audio signal and the headphone jack when it is determined that the call is ended, wherein the headphone jack adaptor device is a device called light stick, the light stick is a dual-way communication device and comprises a visible-light transmitter connected to left and right channels of the headphone jack, and the visible-light transmitter is configured to output a light signal to an optical receive end device; and
   a headphone jack access detecting module, configured to detect whether a headphone jack adaptor device is inserted into the headphone jack, wherein
   the status switchover module is further configured to: when it is determined that it is required to make/answer a call or the call is ended, process according to a detection result of the headphone jack access detecting module; and if a headphone jack adaptor device is inserted into the headphone jack, perform the step of disconnecting or establishing a signal connection between an audio signal and a headphone jack, and if no, skip performing the step of disconnecting or establishing a signal connection between an audio signal and a headphone jack.

5. The terminal according to claim 4, wherein the headphone jack adaptor device is an adaptor terminal for non-contact communication, and a communication medium of the non-contact communication is at least one medium selected from the group consisting of: visible light, infrared light, ultraviolet light, an infrasonic wave, an audible wave, and an ultrasonic wave.

6. The terminal according to claim 5, wherein the headphone jack adaptor device is a light stick, and the light stick comprises a visible-light transmitter connected to left and right channels of the headphone jack and an infrared-light receiver connected to a microphone channel of the headphone jack.

* * * * *